United States Patent [19]
Allan

[11] 4,082,525
[45] Apr. 4, 1978

[54] REMOVABLE FLUID SEALING MEMBER

[75] Inventor: Thomas T. Allan, San Francisco, Calif.

[73] Assignee: Flanders Filters, Inc., Washington, N.C.

[21] Appl. No.: 685,978

[22] Filed: May 13, 1976

[51] Int. Cl.² .................. B01D 46/10; F16J 15/14
[52] U.S. Cl. .................................. 55/355; 55/502; 55/DIG. 9; 277/79; 277/135; 277/152; 98/32
[58] Field of Search ............... 55/355, 483, 484, 495, 55/502, 511, DIG. 31, 385 A, DIG. 9; 98/32, 40 D; 277/79, 152, 135, DIG. 10; 220/217, 228, 357, 358

[56] References Cited
U.S. PATENT DOCUMENTS

| Re. 27,701 | 7/1973 | Allan, Jr. et al. | 55/355 |
|---|---|---|---|
| 634,677 | 10/1899 | Vaughn | 220/228 |
| 685,542 | 10/1901 | Walsh | 220/228 |
| 1,906,685 | 5/1933 | Wiggins | 220/217 |
| 2,367,882 | 1/1945 | McKnight | 277/79 |
| 2,701,155 | 2/1955 | Estel, Jr. | 277/152 |
| 3,280,540 | 10/1966 | Soltis | 55/502 |
| 3,280,541 | 10/1966 | Soltis | 55/483 |
| 3,486,311 | 12/1969 | Allan, Jr. | 55/355 |

Primary Examiner—Frank W. Lutter
Assistant Examiner—David L. Lacey
Attorney, Agent, or Firm—Bell, Seltzer, Park & Gibson

[57] ABSTRACT

A sealing member adapted to form a fluid seal about an opening in an air flow system and which may be removed from the system in the event of the contamination of the fluid. In a preferred embodiment, the sealing member comprises a retainer having a cross-sectional configuration which defines a pair of continuous, open, generally U-shaped channels, and with a fluid of relatively high consistency substantially filling each channel. The retainer is adapted to be releasably and sealably mounted to each of the housing and a member disposed across the opening in the housing, and including a flange extending into each channel and the fluid therein to effect a seal.

12 Claims, 14 Drawing Figures

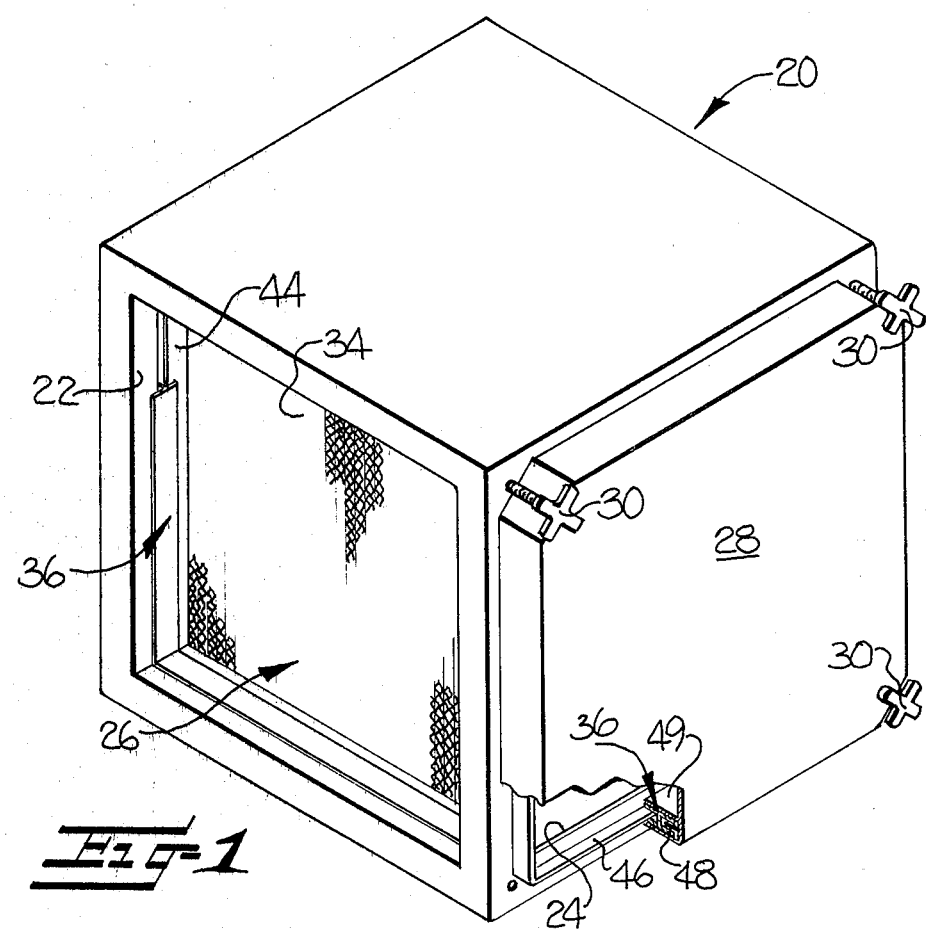
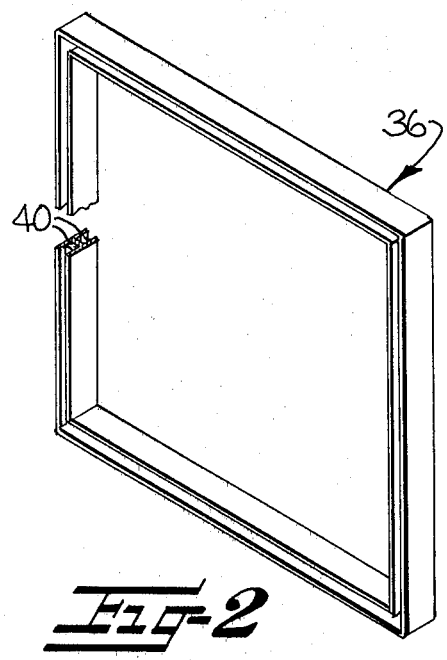
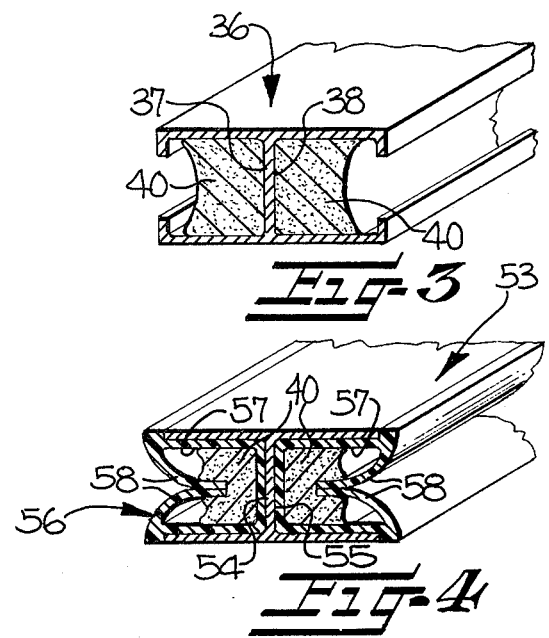

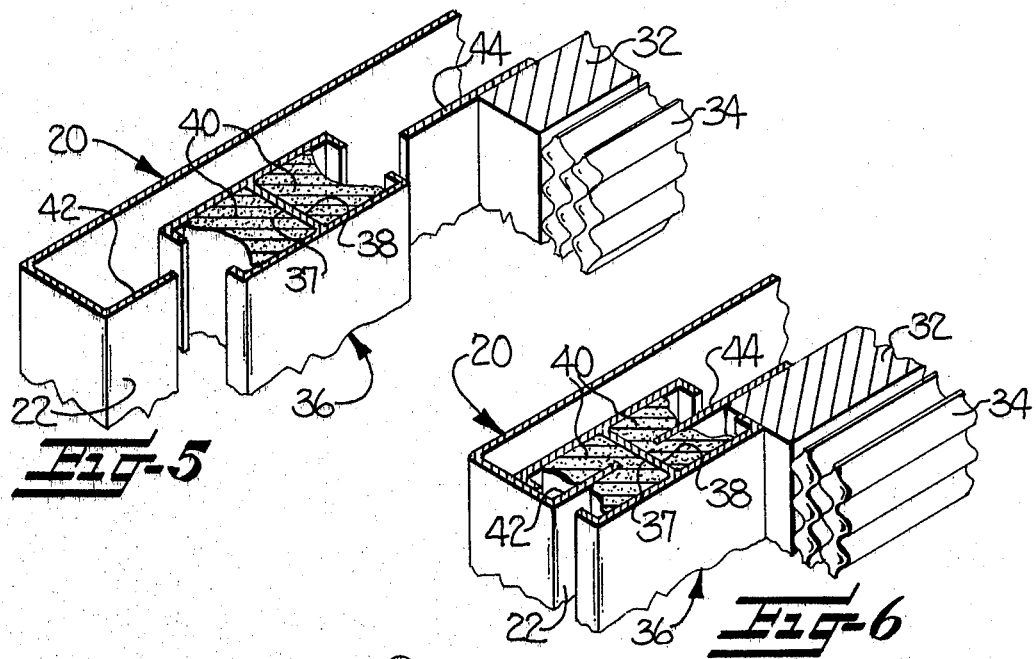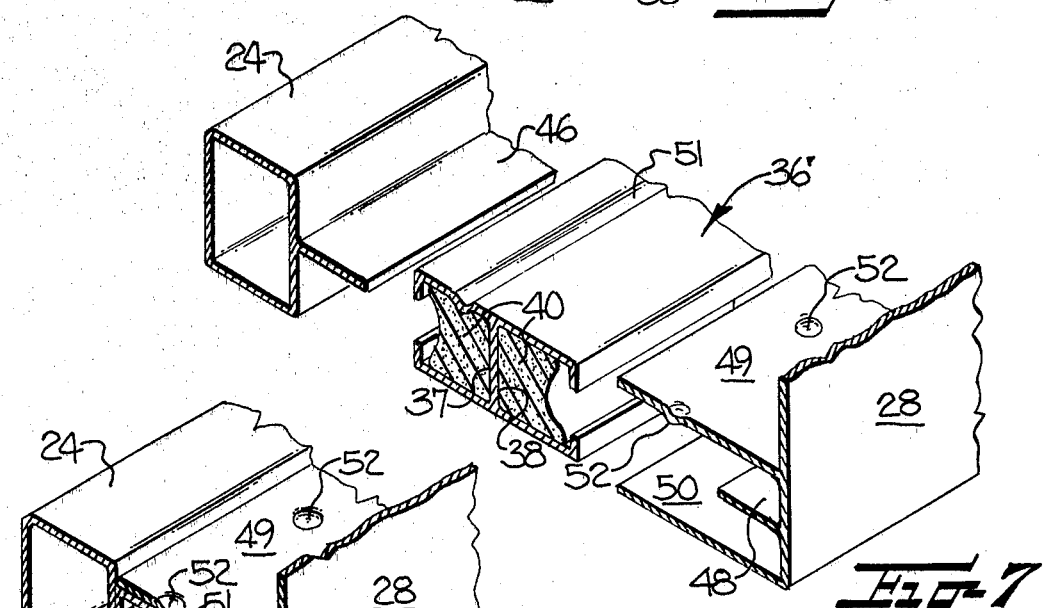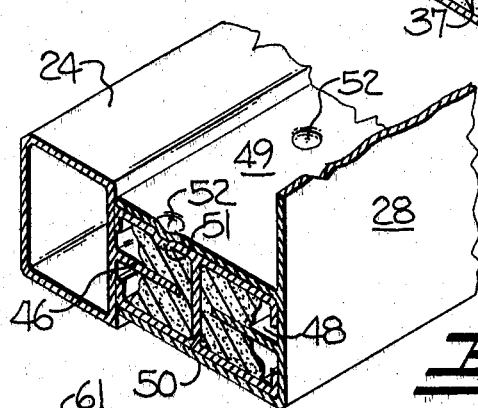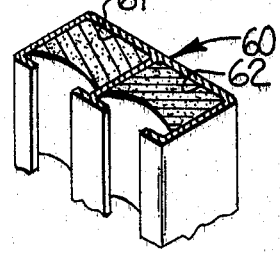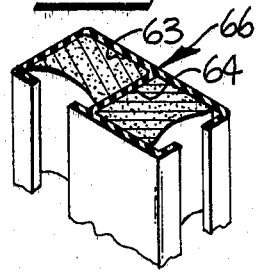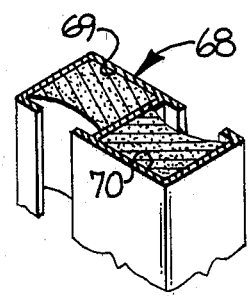

REMOVABLE FLUID SEALING MEMBER

The present invention relates to a fluid sealing member adapted to form a part of an air flow system and characterized by the ability to be totally removed from the system in the event of the contamination of the fluid in the sealing member.

Enclosed air flow systems are presently widely used to provide a clean supply of air in a number of different industrial, research and hospital applications. For example, such systems commonly employ high efficiency particulate air filters (known in the art as HEPA or absolute filters) to provide essentially particle free air to laboratories and critical manufacturing areas. In the case of clean rooms and other environmentally controlled enclosures, the HEPA filters are adapted to provide a clean supply of air under laminar flow conditions throughout the full area of the room.

Enclosed air flow systems employing HEPA filters are also used for the collection and containment of harmful materials, such as potentially radioactive substances, dangerous viable organisms, or carcinogenic or toxic materials. Thus for example, in the case of a nuclear power generating facility, it is common to direct the exhaust of the cooling air system through one or more banks of HEPA filters to preclude the release of potentially radioactive materials into the atmosphere.

As will be readily apparent, it is vitally important to maintain the integrity of air flow systems of the described types, since leakage of even sub-micron sized particles from the system can often have serious consequences. In this regard, leakage frequently occurs around or through the joints in the conventional neoprene gaskets employed to sealably mount the filters in the housing, or through the various structural components of the system, such as between adjacent duct sections, or around doors or windows in the system.

The prior U.S. Pat. to Allan et al., No. Re. 27,701 discloses a high efficiency or HEPA air filter which utilizes a fluid of high consistency to seal the filter in a supporting housing. More particularly, the Allan et al. filter has a continuous channel formed in the front periphery of the frame, and a fluid having a consistency substantially the same as that of household petrolatum is disposed in the channel. The fluid filled channel is adapted to sealably receive a mating retaining flange mounted in the housing, with the retaining flange being embedded in the fluid to seal the filter in assembled relation therein.

The fluid sealing structure of the Allan et al. patent represents a vast improvement over the previously employed neoprene gasket seals, and has met with a great deal of commercial success since a near perfect and non-deteriorating seal is achieved under normal operating conditions. However, in certain instances where the fluid sealed filter is utilized for the collection and containment of harmful materials as noted above, the presence of the fluid in the air filtration system has been a source of concern. More particularly, it has been feared that the harmful materials may contaminate the fluid, and that a small portion thereof may adhere to and remain on the surfaces of the mating retaining flange in the housing as contaminated residue after the periodic replacement of the filters. As will be readily apparent, the build-up of a potentially contaminated residue in the housing could result in a substantially safety hazard.

Also, the fluid sealing structure of the Allan patent has not been used in the sealing of the other various structural components of an air flow system, since heretofore there has been no easy and safe procedure by which the fluid may be removed from the system in the event it becomes contaminated or otherwise deteriorates and needs to be replaced.

It is accordingly an object of the present invention to provide a fluid sealing apparatus which is adapted to form a seal between a HEPA filter or the like and its housing, or between the various structural components of an air flow system, and wherein the fluid may be easily removed from the system in the event it becomes contaminated.

It is a further object of the present invention to provide a housing assembly for an air flow system which utilizes a fluid sealing material therein, and having provision for insuring that substantially all of the fluid may be removed from the assembly in the event it becomes contaminated or otherwise needs to be replaced.

These and other objects and advantages of the present invention are achieved in the embodiments described herein by the provision of a sealing member which comprises a retainer disposed along the periphery of an opening in the housing, with the retainer defining at least one open channel in cross-section. A fluid having a consistency substantially the same as that of petrolatum substantially fills the channel, and the retainer is releasably and sealably mounted to each of the housing and a member which covers the opening therein. This sealing means includes a flange carried by one of the housing and covering member, with the flange having a peripheral outline corresponding to that of the retainer channel and extending into the channel and fluid to effect a seal therebetween.

In a preferred embodiment, the retainer has a closed peripheral outline, and a cross-sectional configuration which defines a pair of continuous, open, generally U-shaped channels which face in opposite directions. The fluid is disposed in each of the channels, such that the retainer is adapted to sealably receive a mating flange which is mounted about the opening in the housing in one of the channels, and sealably receive another mating flange carried on the member which covers the opening in the other of the channels.

Some of the objects of the invention having been stated, other objects will appear as the description proceeds, when taken in connection with the accompanying drawings, in which FIG. 1 is a perspective view, partly broken away, of a side loading filter housing and which includes a fluid sealing member which embodies the present invention, both between the periphery of the air flow opening and the filter, and the periphery of the side opening and door;

FIG. 2 is a perspective view of a fluid sealing member as employed in the housing of FIG. 1;

FIG. 3 is a fragmentary sectional view of the fluid sealing member of FIG. 2;

FIG. 4 is a view similar to FIG. 3 but illustrating a second embodiment of the sealing member;

FIG. 5 is a fragmentary sectional exploded perspective view of the housing, sealing member, and filter of FIG. 1;

FIG. 6 is a view similar to FIG. 5 and showing the sealing member and filter in assembled position;

FIG. 7 is a fragmentary sectional exploded perspective view of the housing, sealing member, and door of FIG. 1;

FIG. 8 is a view similar to FIG. 7 and showing the sealing member and door is assembled or closed position;

FIGS. 9-11 are similar fragmentary sectional perspective views of various alternative embodiments of sealing members which embody the present invention;

Figure 12:
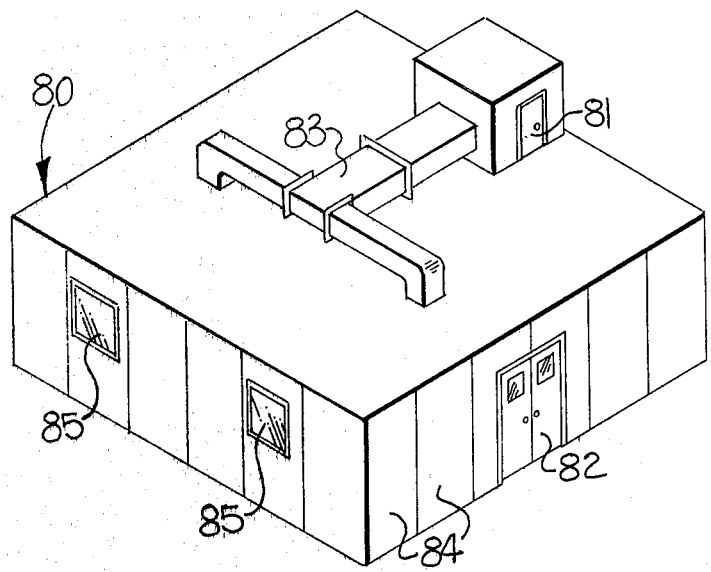
FIG. 12 is a perspective view of an environmentally controlled enclosure which is adapted to incorporate the sealing member of the present invention between several of the structural components thereof.

Referring more specifically to the drawings, FIG. 1 illustrates a side loading housing 20 adapted to form a part of an air flow system, such as an exhaust air cleaning system in a nucleur fuel manufacturing facility. More particularly, the housing 20 comprises a generally box-like enclosed structure having aligned openings in the two opposite end walls to permit a straight line air flow therethrough (only the front opening 22 being visible), and an access opening 24 in one side wall thereof for inserting and removing a filter 26.

The housing 20 is typically fabricated from sheet metal material, such as 14 gauge stainless steel, and a conventional mechanism (not shown) may be positioned within the housing for selectively moving the filter 26 forward and away from the forward opening 22 after it has been inserted through the side access opening 24. A side access air impermeable door 28 is disposed across the side opening to cover the same, the door being held in the illustrated closed position by means of the four hand operated clamps 30.

In the illustrated embodiment, the housing 20 mounts a single filter 26 which typically measures 24 × 24 × 12 inches in size. The filter 26 comprises a wooden or chipboard frame 32 surrounding and supporting a pleated filtering media 34, such as non-woven fiberglass or cellulose-asbestos sheet material. Filters of this type may have extremely high dust retention characteristics, usually greater than about 95% efficiency, and typically 99.97% efficiency, as measured by the conventional DOP test, and are known as "absolute" or HEPA filters in the art.

In accordance with the present invention, means are provided for releasably sealing the periphery of the opening 22 in the housing to the periphery of the filter 26 when the filter is in its operative position disposed across or covering the opening 22. This sealing means comprises a separate retainer 36 disposed intermediate the peripheries of the opening 22 and filter 26, the retainer 36 having a closed or endless rectangular peripheral outline to form a continuous seal about the periphery of the opening 22, and a generally H-shaped cross-sectional configuration, note FIGS. 2 and 3. Thus the retainer 36 defines a pair of continuous open channels 37, 38, each having a generally U-shaped cross-sectional configuration, with the channels facing in opposite directions which are perpendicular to the plane defined by the peripheral outline of the retainer. The retainer may be fabricated from a suitable metallic material, such as aluminum, or from an extruded elastomeric material, such as neoprene or silicone rubber. The rectangular peripheral outline of the retainer may be formed from four straight segments, which are beveled and interconnected at their ends to form a right angled miter joint at each of the four corners.

The sealing means further comprises a fluid 40 substantially filling each of the channels 37, 38 of the retainer. Several highly viscous, non-Newtonian fluids, such as household petrolatum, or a silicone grease having a consistency substantially the same as that of household petrolatum, have been found to be very satisfactory for use as the fluid 40. Such fluids may be further characterized as being non-corrosive, non-evaporating, semi-solid at room temperature, and subject to easy deformation at room temperature. As a particular example, a silicone grease manufactured and sold by Dow Chemical Corporation as Product No. 111 may be employed. This silicone material has an N.L.G.I. consistency of 2 to 3, and a penetration (ASTM D217) of about 220 – 240. Also, it maintains its consistency over a temperature range from about minus 40° to 500° F., which is desirable where the housing and filter may be subjected to temperature extremes.

A rearwardly directed continuous flange 42 is fixedly carried by the housing about the periphery of the opening 22. The flange 42 extends in a direction perpendicular to the plane of the opening 22, and has a peripheral outline corresponding to that of the associated channel in the retainer 36. In the assembled position as seen in FIG. 6, the flange 42 extends into the channel 37 and the fluid 40 therein, to releasably and sealably mount the retainer to the housing 20.

A forwardly directed continuous flange 44 is fixedly and sealably mounted about the periphery of the filter frame 32. The flange 44 has a peripheral outline which corresponds to that of the channel 38 of the retainer 36, such that the flange 44 is adapted to extend into the channel 38 and the fluid 40 therein to releasably and sealably mount the filter 26 to the retainer 36 and thus the housing 20, note FIG. 6.

To assemble the filter 26 in the housing 20, the retainer 36 is initially inserted through the side opening 24 and assembled to the housing by pressing the retainer forwardly such that the channel 37 receives the flange 42. Next, the filter 26 is inserted into the housing and pressed forwardly such that its flange 44 enters the other channel 38, and the filter serves as a covering member across the opening 22. Alternatively, the retainer 36 could initially be assembled to the filter 26 outside of the housing, and the assembled retainer and filter inserted into the housing and then pressed forwardly onto the flange 42. In the event it is desired to remove and replace the retainer and fluid, the filter and retainer may be withdrawn by reversing the above procedure.

The housing further includes similar means for releasably sealing the periphery of the door 28 to the periphery of the side opening 24. The door 28 serves as an air impermeable covering member or panel for precluding passage of air through the opening, and in this instance, the sealing means comprises a second fluid filled retainer 36', a flange 46 fixedly positioned about the side opening of the housing and extending perpendicular to the plane of the opening 24, and another flange 48 carried about the periphery of the door 28, note FIGS. 7 and 8. As illustrated, the door 28 also includes upper and lower guide flanges 49, 50 on either side of the flange 48 for the purpose of aligning the retainer 36' and door 28 during closing of the same and in the manner apparent from FIG. 8. Thus the retainer 36' and fluid may be readily separated and removed from the housing 20 and door 28 by simply opening the door and removing the retainer.

The retainer 36' is similar to the retainer 36, with the exception that one of the side walls includes a longitudinal depression 51 which is adapted to receive a detent 52 mounted on the inside surface of the flange 49. By this arrangement, the retainer 36' may be releasably assembled to the door to thereby facilitate the removal of the retainer from the housing. As will be understood, a similar releasable engagement could be provided between the filter 26 and retainer 36 to cause the retainer to be withdrawn from the housing with the filter.

FIG. 4 illustrates an alternative embodiment of a retainer 53 embodying the present invention, and which includes means for wiping the sides of the mating flanges substantially free of the fluid upon separation and removal of the retainer. More particularly, the retainer includes oppositely directed channels 54, 55, and the wiping means comprises a resilient elastomeric wiping member 56 disposed within each channel, and comprising a U-shaped portion 57 disposed within the channel, and a pair of resilient wiper lips 58 mounted to extend across the top of the U-shaped portion and the channel. The lips 58 are highly flexible, and are arcuately curved in cross-section such that the outer extremities thereof extend downwardly into the U-shaped portion and into the fluid which is disposed within the U-shaped portion and generally below the wiper lips. As will be apparent, the wiper lips 58 will contact each side of the mating flange during assembly of the retainer onto the flange and while the retainer is assembled thereon, and further serve to wipe the sides of the flange substantially free of the fluid upon the retainer being withdrawn from the flange to thereby avoid the build-up of a potentially contaminated residue of the fluid on the flange. A more detailed description of the wiping member 56 may be obtained by reference to applicant's copending application Ser. No. 685,977 entitled SELF-CLEANING FLUID SEALED AIR FILTER and filed concurrently herewith.

FIGS. 9-11 illustrate three additional embodiments of the present invention. In particular, FIG. 9 illustrates a fluid filled retainer 60 wherein the two channels 61, 62 face in a common direction, and which would be used where the flanges of the housing and covering member extend in a common coaxial direction. In FIG. 10, the two channels 63, 64 of the retainer 66 face in directions disposed at right angles to each other. This embodiment may be used when the retainer of the sealing member is in the form of a linear strip having terminal ends, and it has an advantage in certain instances since its right angled configuration permits the covering member to be pulled away from the housing and retainer without risk of also pulling the retainer from the housing. Where the retainer 66 has a closed or continuous peripheral outline, the retainer is preferably fabricated from a flexible elastomeric material to permit the walls of the retiner to be opened to admit flanges which would be similarly disposed at right angles. The retainer 68 of FIG. 11 is similar to the retainer 36 in that the two channels 69, 70 face in opposite directions, but the channels 69, 70 are laterally offset rather than being aligned.

Figure 13:
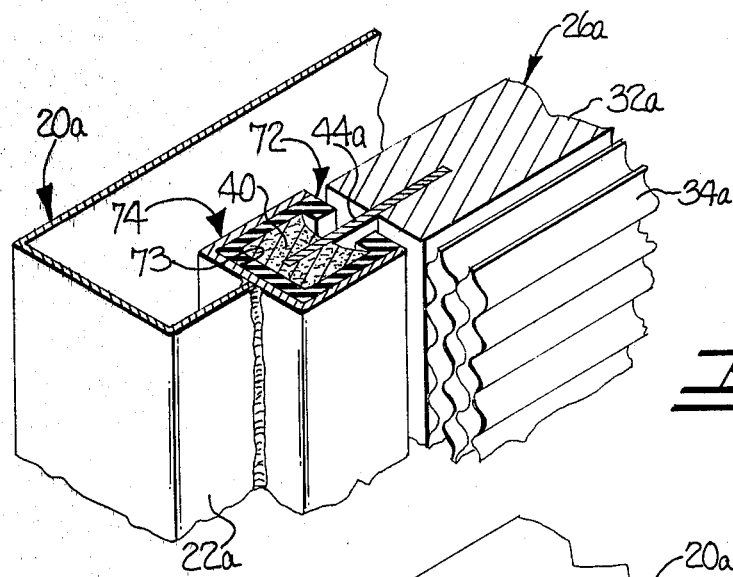
FIG. 13 is a fragmentary sectional perspective view of a housing and assembled filter, and utilizing another embodiment of the removable sealing member of the present invention.
Figure 14:
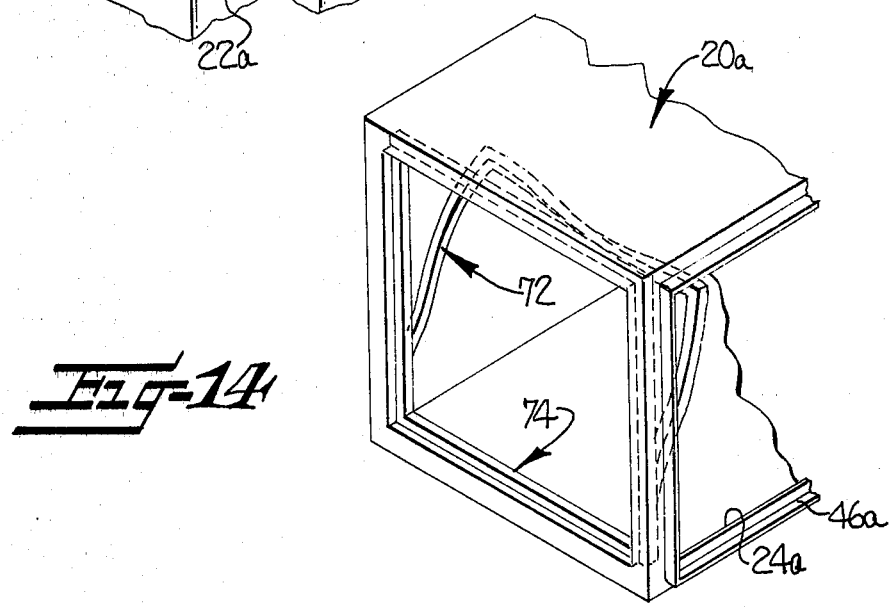
FIG. 14 is a perspective view of the housing of FIG. 13, and schematically illustrating the removal of the sealing member.

In the embodiment of FIGS. 13 and 14, the retainer 72 is configured to define a single U-shaped channel 73 in cross-section, with the channel 73 being substantially filled with a fluid 40 of high consistency as described above. The means for releasably and sealably mounting the retainer 72 to the housing 20a includes a continuous U-shaped receptacle 74 fixedly and sealably mounted to the housing about the entire periphery of the air flow opening 22a. The retainer 72 is preferably fabricated from a resilient elastomeric material, and is closely received within the receptacle 74 such that the walls of the retainer resiliently press against the walls of the receptacle to form a seal therebetween. In use, the retainer 72 is initially positioned within the receptacle 74, and the filter 26a then assembled thereto by pressing the same forwardly such that the flange 44a enters the channel 73 and penetrates the fluid 40. If desired, the flange 44a may extend forwardly a distance sufficient to engage the bottom wall of the retainer 72 and thereby provide a gasket-like pressure seal to thereby further seal the retainer in the receptacle 74. To remove the retainer 72 and fluid, the filter 26a is initially withdrawn, and the retainer may then be removed from the receptacle 74 in the manner schematically illustrated in FIG. 14. In this regard, in installations where a high level of radioactivity may be present, the retainer 72 may be gripped and withdrawn from the receptacle and housing by means of a remotely operated manipulator.

FIG. 12 illustrates an air flow housing assembly in the form of a generally conventional environmentally controlled enclosure 80, and which is adapted to incorporate the present invention in forming a removable seal between several of the structural components thereof. For example, the seal of the present invention may be incorporated about the filter housing door 81 and the main access doors 82, between adjacent sections of the air supply ductwork 83, between the adjacent wall panels 84, and around the windows 85. In this regard, it will be understood that while the housing 20 as shown in FIG. 1 mounts only a single filter, the present invention may be employed in association with housings mounting a plurality of filters in a side by side arrangement in an air flow system, or in association with a housing in the form of a supporting gridwork for a wall or bank of filters as illustrated, for example, in FIG. 1 of said copending application Ser. No. 685,977.

While the illustrated embodiments of the retainers all have channels of generally rectangular outline, it should be understood that the term "U-shaped" as employed herein is intended to include a cross-sectional outline having somewhat tapered or converging side walls. This latter configuration would be useful in certain instances to guide the mating flange into the channel and thereby centrally align the mating filter or other covering member during the assembly of the filter or covering member onto the retainer. Also, while the disclosed preferred embodiments illustrate retainers having one or two channels, the retainer may in certain instances have more than two channels. Thus for example, a flexible retainer as shown in FIG. 10 could include a third channel facing oppositely from the channel 63 such that those two channels are adapted to receive oppositely directed flanges, while the channel 64 receives a flange from a transverse covering member.

In the drawings and specification, there has been set forth a preferred embodiment of the invention, and although specific terms are employed, they are used in a generic and descriptive sense only and not for purposes of limitation.

That which is claimed is:

1. A housing assembly adapted to form a part of an enclosed air flow system and utilizing a fluid sealing material therein, and characterized by the ability to remove the fluid sealing material from the system in the event of the contamination thereof, and comprising
- a housing having an opening therein,
- a covering member disposed across said opening,
- means for releasably sealing the periphery of said covering member for the periphery of said opening to preclude the passage of air therebetween while permitting the covering member to be withdrawn and removed from its position across said opening, said sealing means comprising
  - (a) a retainer disposed along the periphery of said opening, said retainer having a generally U-shaped cross-sectional configuration and defining at least one open channel in cross-section,
  - (b) a fluid substantially filling said at least one channel, said fluid having a consistency substantially the same as that of petrolatum and characterized as being subject to easy deformation at room temperature, and
  - (c) means for releasably and sealably interconnecting said retainer to each of said housing and covering member, and including a flange mounted to one of said housing and covering member, said flange having a peripheral outline corresponding to that of said at least one retainer channel and extending into said at least one channel and fluid to effect a seal therebetween, and a receptacle fixedly and sealably mounted to the other of said housing and covering member, said receptacle having a generally U-shaped cross-sectional configuration defining an open side, and closely receiving said retainer therein to form a seal between the receptacle and retainer, and such that the retainer may be separated from the receptacle by withdrawing the retainer through the open side of the receptacle,
  - whereby the retainer and fluid carried therein may be separated from the housing and covering member by withdrawing the covering member from the opening and removing the retainer.

2. The housing assembly as defined in claim 1 wherein said covering member comprises a high efficiency air filter adapted to remove sub-micron sized particles from the air passing through said opening and filter.

3. The housing assembly as defined in claim 1 wherein said covering member comprises an air impermeable panel for precluding passage of air through said opening.

4. The housing assembly as defined in claim 1 wherein said receptacle and said retainer each have a closed peripheral outline to form a continuous seal about the entire periphery of said opening and covering member.

5. The housing assembly as defined in claim 1 wherein said retainer comprises a resilient elastomeric material.

6. A housing assembly adapted to form a part of an enclosed air flow system and utilizing a fluid sealing material therein, and characterized by the ability to remove the fluid sealing material from the system in the event of the contamination thereof, and comprising
- a housing having an opening therein,
- a covering member disposed across said opening,
- means for releasably sealing the periphery of said covering member to the periphery of said opening to preclude the passage of air therebetween while permitting the covering member to be withdrawn and removed from its position across said opening, said sealing means comprising
  - (a) a retainer disposed along the entire periphery of said opening, said retainer including a pair of continuous, open channels each having a generally U-shaped cross-sectional configuration,
  - (b) a fluid substantially filling each of said channels of said retainer, said fluid having a consistency substantially the same as that of petrolatum and characterized as being subject to easy deformation at room temperature,
  - (c) means comprising a flange mounted to said housing and having a peripheral outline corresponding to that of one of said channels and extending into said one channel and the fluid therein, for releasably and sealably mounting said retainer to said housing, and
  - (d) means comprising a flange mounted to said covering member and having a peripheral outline corresponding to that of the other of said channels and extending into said other channel and the fluid therein, for releasably and sealably mounting said covering member to said retainer,
  - whereby said retainer and fluid may be separated from the housing and covering member by withdrawing the covering member and removing the retainer.

7. The housing assembly as defined in claim 6 wherein said retainer has a generally U-shaped cross-sectional configuration such that said channels face in opposition directions.

8. The housing assembly as defined in claim 6 further comprising a pair of resilient wiper lips mounted on said retainer and extending across the top of at least one of said channels from opposite sides thereof and contacting the opposite sides of the associated flange for wiping the sides of the flange substantially free of the fluid upon separation of the retainer therefrom.

9. A sealing member adapted to form a fluid seal between an opening in an air duct housing and a covering member such as a filter or door panel and characterized by the ability to remove the sealing member from the system in the event of the contamination of the fluid or the like, and comprising
- a retainer having a closed peripheral outline, and a cross-sectional configuration which defines a pair of continuous, open, generally U-shaped channels, said channels each having a closed peripheral outline and collectively having a cross-sectional area substantially equal to the cross-sectional area of said retainer, and
- a fluid substantially filling each of said channels and having a consistency substantially the same as that of petrolatum and characterized as being subject to easy deformation at room temperature,
- whereby the sealing member is adapted to sealably receive a mating flange which is mounted about the opening in the housing, in one of the channels, and sealably receive another mating flange carried on a member which covers the opening, in the other of the channels, to thereby form a releasable and removable seal between the opening and covering member.

10. The sealing member as defined in claim 9 wherein said retainer has a generally rectangular peripheral outline, and said channels face in opposite directions which are perpendicular to the plane defined by the peripheral outline.

11. The sealing member as defined in claim 9 wherein said channels face in a common direction.

12. The sealing member as defined in claim 9 wherein said retainer is fabricated from a flexible material, and said channels face in directions disposed at right angles to each other.

* * * * *